April 9, 1929.  C. E. GRAY  1,708,307

METHOD OF TESTING BUTTER AND APPARATUS FOR PRACTICING SAME

Filed Nov. 7, 1925

Inventor:
Chester Earl Gray
By Cheever + Cox Attys.

Patented Apr. 9, 1929.

1,708,307

UNITED STATES PATENT OFFICE.

CHESTER EARL GRAY, OF OAKLAND, CALIFORNIA.

METHOD OF TESTING BUTTER AND APPARATUS FOR PRACTICING SAME.

Application filed November 7, 1925. Serial No. 67,516.

My invention relates to methods of testing butter and apparatus therefor and one of the objects of the invention is to provide a method for determining the weight of the moisture and the weight of the constituent elements with the least liability of error and the least exercise of care and skill. Another object is to provide a receptacle which particularly lends itself to the practicing of such method.

Figure 1:
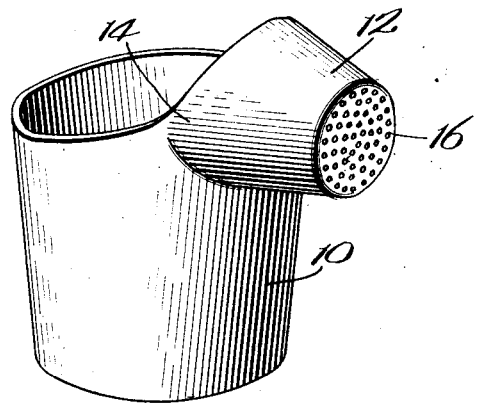

I obtain my objects by the aid of the apparatus illustrated in the accompanying drawings, in which Figure 1 is a perspective view.

Figure 2:
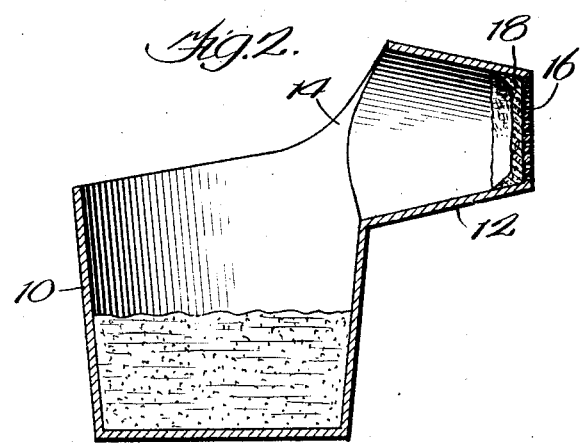
Figure 3:
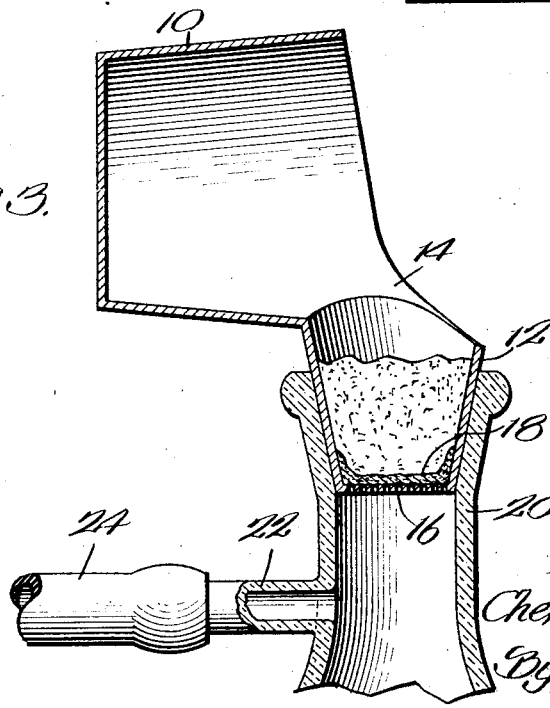

Figure 2 is a vertical sectional view showing the butter in the evaporating compartment of the receptacle; and Figure 3 is a vertical sectional view showing the apparatus in the filtering position and connected to a suction flask by which the filtering operation is expedited.

Like numerals denote like parts throughout the several views.

It is frequently necessary to test butter for four things—moisture, butterfat, curd and salt. One of the approved methods in use today is as follows:

The operator provides himself with two separate vessels, one of which is an evaporating dish and the other a filter crucible having perforations in the bottom overlaid with filtering material, preferably asbestos fiber. According to this process the operator first obtains the exact weight of each vessel. Then he introduces a quantity of butter into the evaporating dish and obtains accurately the total weight of the dish and contents. Sufficient heat is then applied to evaporate the moisture from the sample, after which the weight is again taken, the loss in weight representing the moisture content. The remaining constituents are then treated with a fat solvent, for example, petroleum ether, and the whole transferred to the filtering crucible. The fat solution is then permitted to pass out through the filter, the process usually being expedited by the aid of a suction flask. The curd and salt remain on the filter in the crucible, and by subtracting the weight of the crucible itself from the combined weight of the crucible and its contents after the fat solution has passed out, the weight of the curd and salt is obtained. The weight of the butterfat is then obtained by subtracting the weight of the moisture plus the weight of the salt and curd from the weight of the original sample of butter. It will be noted that according to the above described method the substances remaining after the evaporation of moisture are transferred from one vessel to another, and it will be evident that if this work is carelessly done, for example, by leaving a portion of the contents in the evaporating dish, an error will creep into the calculations. Other sources of error are present, for example, some of the contents may be spilled in the act of transferring from one vessel to the other. Furthermore, it is necessary to weigh and note the weight of two separate vessels. According to my method it is necessary to weigh but a single vessel, and errors are eliminated from such sources as failure to transfer all the contents from one vessel to another or from accidentally spilling.

I will first describe the apparatus and then the method according to which it is used.

The apparatus consists of a vessel having two compartments 10 and 12. Compartment 10 is imperforate and open at the top and constitutes an evaporating dish which may be placed upon a hot plate or other source of heat. The compartment 12 has an axis substantially at right angles to the axis of the compartment 10, although it communicates with it so that the contents may be readily transferred from one compartment to the other without danger of spilling. While the design may be somewhat varied an advantageous one is shown in which the two compartments are substantially frustoconical and the axis of the second compartment 12 is only slightly higher than the upper rim of the main compartment, the intersection of the two compartments thus forming approximately a conic section and guide walls 14 being formed to reduce the danger of spilling the contents when the apparatus is tilted to transfer the contents from one compartment to another.

At the outer end of compartment 12 there is a perforated bottom 16 over which lies filtering material 18 such, for example, as asbestos fiber.

In using my apparatus according to my improved method the operator first obtains the exact weight of the apparatus itself. He then introduces a sample of butter into the evaporating compartment 10 and notes the exact weight of the apparatus and contents.

He then places the bottom of compartment 10 upon an electrically heated plate or otherwise evaporates the moisture from the contents.

The loss in weight as a result of the evaporation of course gives the weight of the moisture content.

The operator next introduces a solvent which will dissolve the butterfat but not the salt or curd. This may be accomplished by the use of petroleum ether. After a solution has thus been obtained the vessel is tilted from the position shown in Figure 2 to the one shown in Figure 3, which causes the contents to flow from the evaporating compartment 10 to the filtering compartment 12. The fluid is then permitted to filter through the bottom of compartment 12, and to hasten the filtering process it is desirable to force the lower end of compartment 12 into the mouth of a suction flask 20 illustrated fragmentarily in Figure 3. Any suitable means such as the nipple 22 and tube 24 may be employed for creating a partial vacuum within the flask.

After the dissolved butterfat has passed down through the filter into the flask the vessel and contents are again weighed and by subtracting from this figure the weight of the vessel itself the weight of the curd and salt is obtained. My process and apparatus are neither of them particularly concerned with the determination of the respective weights of the curd and salt.

The operator now having determined the weight of the original sample, the weight of the moisture, and the weight of the curd and salt, may readily compute the weight of the butterfat. It is necessary merely to add the weight of the moisture to that of the curd and salt and subtract the total from the weight of the original sample of butter.

From the foregoing it will be evident that I have provided means and a method for quickly and accurately determining the weight of the moisture of the butterfat and the combined weight of the salt and curd in any given sample of butter. The chance for error is greatly reduced by the fact that it is not necessary for the operator to exercise special care in transferring the contents from the evaporating compartment 10 to the filtering compartment 12. Whether transferred completely or not, the weight of the whole is present in the apparatus and will be included in the computation regardless of whether the material is all within the filtering compartment or not. Furthermore on account of the conical or flaring shape of the evaporating compartment the contents will tend to drain into the filtering compartment when the latter is in acting position as shown in Figure 3. Thus the operator may act much more quickly and exercise much less care and skill than is required where two separate vessels are employed. Furthermore the computations are simplified because the operator has to deal with only one weight so far as the apparatus itself is concerned.

Having thus described my invention what I claim as new and desire to secure by Letters Patent is:

1. The method of determining the weight of butterfat in butter consisting in introducing butter into a receptacle, evaporating the moisture, obtaining the weight of the receptacle and contents after the moisture has been evaporated, dissolving the butterfat in the same vessel in a solvent in which the butterfat alone is soluble, filtering out through the same vessel the butterfat solution, weighing the receptacle and contents, and finally subtracting the weight thus obtained from the weight previously obtained.

2. A vessel for testing butter comprising two integrally formed compartments, one of which is imperforate and the other has a porous portion to serve as a filter, said compartments communicating with each other whereby the butter may be transferred from one to the other without altering the combined weight of the receptacle and contents.

3. A vessel for testing butter comprising two integrally formed compartments, one for containing the sample during the evaporation of the moisture therefrom, and the other having a porous portion adapted to serve as a filter, said compartments communicating with each other and having their bottoms arranged approximately in planes at right angles to each other and the evaporating compartment having a flaring side whereby the contents tend to drain into the filtering compartment when the latter is in use.

4. A vessel for testing butter comprising two integrally formed open-top compartments having substantially flat bases arranged approximately at right angles to each other, the compartments communicating with each other, being joined along a line below the upper rim of one of said compartments.

5. A vessel for testing butter comprising two integrally formed intercommunicating compartments which are substantially circular in cross section and arranged with axes intersecting approximately at right angles, one compartment having an imperforate bottom adapted to serve as an evaporating dish and the other having a porous portion adapted for filtering purposes, the compartments being joined together below their upper rims to provide guarding walls forming a channel to facilitate pouring from one compartment to the other without spilling.

6. A vessel for testing butter comprising two integrally formed intercommunicating compartments of substantially frusto-conical shape having axes intersecting approximately at right angles, the compartments being joined along a curved line below the upper rim of one of the compartments whereby a channel is formed between them flanked by guard walls to facilitate pouring from one to another, one of the vessels having an imperforate bottom and the other having a porous bottom.

7. A vessel for quantitative analysis comprising two integrally formed and intercommunicating compartments, one of which has imperforate walls, the other having a porous portion adapted to function as a filter through which liquids may be conveniently decanted from the vessel.

8. A vessel for quantitative analysis comprising a plurality of integrally formed intercommunicating compartments, a said compartment having imperforate walls providing an evaporating compartment, another compartment having a perforate wall portion adapted to provide a filter through which liquids may be filtered leaving the insoluble residue within the vessel.

In witness whereof, I have hereunto subscribed my name.

CHESTER EARL GRAY.